United States Patent Office 3,277,025
Patented Oct. 4, 1966

3,277,025
ANION-EXCHANGER FROM CROSSLINKED POLYHYDROXY MATERIALS
Per G. M. Flodin, Perstorp, Johan A. Olof Johansson, Uppsala, and Stig Å. I. Carlsson, Mölnlycke, Sweden, assignors to Aktiebolaget Pharmacia, Uppsala, Sweden, a company of Sweden
No Drawing. Filed Nov. 23, 1965, Ser. No. 509,416
Claims priority, application Sweden, June 12, 1959, 5,620/59
2 Claims. (Cl. 260—2.1)

This is a continuation-in-part of our application No. 34,373 and now abandoned.

The invention generally pertains to substitution products of hydrophilic high molecular weight copolymerizates of aliphatic hydroxyl group-containing substances with bifunctional organic substances. More particularly, this invention relates to substitution products of hydrophilic high molecular weight copolymerizates of aliphatic hydroxyl group-containing substances with bifunctional organic substances, obtained by reacting the hydroxyl groups of the copolymerizates with a monofunctional substance to form novel products possessing valuable properties for different uses and especially useful as cation-exchangers for separating purposes.

In the specification and the claims the term "copolymerizate" is used to define a product obtained by the chemical combination of a number of similar units to form a single molecule, wherein polymerization phenomena, as well as condensation reactions have been involved.

THE INVENTION BROADLY

The novel products according to the present invention are copolymerizates of (a) a member selected from the group consisting of polyvinyl alcohol, dextran, sorbitol, starch, hydroxyethyl cellulose, dextrin, and sucrose;
(b) a bifunctional organic substance selected from the group consisting of epichlorohydrin, butanediol bis-epoxypropyl ether, glycerol-1,3-dichlorohydrin, and bis-epoxypropyl ether which is capable of linking together the aforesaid members of the formation of either linkages;
(c) said copolymerizate originally containing 10 to 35 percent of hydroxyl groups, based on the weight of the dry substance, and having from 6 to 50 percent of their hydroxyl groups substituted by a member selected from the group consisting of radicals of the type —$R_1Y$, wherein
(d) $R_1$ is an alkylene containing from 1 to 2, inclusive, carbon atoms and
(e) Y is selected from the group consisting of dimethylamino, diethylamino, di-(hydroxyethyl)amino, and beta-morfolino; and said novel compound
(f) being insoluble in water but capable of swelling therein;
(g) having a water regain within the range of 1 to 50 gram per gram of the dry compound, and
(h) having an ion exchange capacity within the range of from 2 to 6 milliequivalents per gram of the dry compound.

From physical viewpoint, the novel substituted copolymerizates consist of a three-dimensional macroscopic network of residues of the aliphatic hydroxyl group-containing substances, bonded together by ether bridges of the formula —R—O—X—O—R—, wherein R represents the residue of the aliphatic hydroxyl group-containing substance and X is a residue of the bifunctional substance, the said copolymerizates having connected thereto by oxygen bridges groups of the general formula —$R_1Y$, wherein $R_1$ and Y each have the above significance. In addition to the substituted copolymerizates as substances, the invention also includes anion-exchangers consisting of these substances.

The novel substituted copolymerizates according to the invention are preferably obtained by reacting the unsubstituted copolymerizate of the type referred to with a monofunctional substance of the formula $X_1$—$R_1$—Y, wherein $X_1$ is selected from the group consisting of chloro and bromo and $R_1$ and Y have the significances as set forth above.

However, it is also possible to prepare the novel compounds by first reacting one of the members listed under (a) above with the monofunctional substance of the formula $X_1$—$R_1$—Y to introduce the ion-exchanging groups and then carrying out the copolymerization process.

THE HYDROPHILIC HIGH MOLECULAR WEIGHT COPOLYMERIZATE

The hydrophilic high molecular weight copolymerizate used as a starting material for the preparation of the substituted product according to the invention should have a high content of hydroxyl groups. Preferably this content should be in the range of about 10 to 35 percent.

The particle size of the starting material should preferably be in the range of 0.01 to 2 mm.

The water regain of the starting material should be in the range of from 1 to 50 g./g. of the dry copolymerizate. The term "water regain" is intended to mean the amount of water in grams which can be absorbed by 1 g. of the dry condensation product with swelling. The starting material should not contain any charge-producing groups.

The copolymerizates to be used as a starting material for the production of the novel products are obtained by reacting the polyhydroxyl compounds set forth above with the bifunctional organic compounds.

The copolymerization of these organic hydroxyl group-containing substances with these bifunctional substances readily takes place by reacting the components in aqueous solution in the presence of an alkaline reacting substance as a catalyst.

For example, a gel product excellently suitable as a starting material to produce the novel ion-exchangers according to the invention may be obtained by reacting dextran having an average molecular weight within the range of from 5000 to 200,000 with epichlorohydrin which results in a copolymerizate consisting of a three-dimensional macroscopic network, built up of chains of mainly alpha-1,6-glycosidically bonded glucose residues bound together by ether bridges of the type

—O—$CH_2$.CH(OR).$CH_2$—O— said gel having a content of hydroxyl groups of at least 15% of the weight of the dry gel and a water regain within the range of from about 1 to 50 g./g. of the dry gel product.

Another example is a gel produced by reacting white commercial dextrin having an average molecular weight in the range of about 5000 to 50,000 with epichlorohydrin which results in a copolymerizate consisting of a three dimensional microscopic network, built up of chains of mainly alpha-1,4-glycosidically bonded glucose residues bound together by either bridges of the type —O—$CH_2$CH(OH).$CH_2$—O—.  This gel has a hydroxyl group content of at least 15% of the weight of the dry gel and a comparatively low water regain substantially within the range 1-30 g./g. of the dry gel product.

Further, a suitable gel product may be obtained by reacting sorbitol with epichlorohydrin to form a copolymerizate having a water regain within the range of from about 1 to 10 and which is especially suitable for use in cases where the gel may come into contact with a liquid of a comparatively high acidity, for example hydrochloric acid.

THE MONOFUNCTIONAL COMPOUND

Suitable monofunctional substances for carrying out the substitution to form the novel products according to the invention may be selected from chloro or bromo substituted tertiary amines or salts thereof, such as diethylaminoethylchloride,
diethylaminoethylbromide,
dimethylaminoethylchloride,
dimethylaminoethylbromide,
diethylaminomethylchloride,
diethylaminomethylbromide,
dimethylaminomethylchloride,
dimethylaminomethylbromide,
di-(hydroxyethyl)-aminoethylchloride,
di-(hydroxyethyl)-aminoethylbromide,
di-(hydroxyethyl)-aminomethylchloride,
di-(hydroxyethyl)-aminomethylbromide,
β-morfolinoethylethylchloride,
β-morfolinoethylbromide,
β-morfolinomethylchloride,
β-morfolinomethylbromide and salts thereof, for example the hydrochlorides.

REACTION MEDIUM AND CATALYST

The reaction takes place in the presence of water and is catalyzed by alkaline substances. It can be illustrated by the following scheme:

$$\text{gel-OH} + X_1 - R_1 - Y + OH^- \rightarrow$$
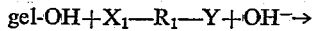
$$\text{gel-O} - R_1 - Y + X_1^- + H_2O$$

wherein $X_1$, $R_1$ and $Y$ have the meanings as set forth above and "gel" means the copolymerizate referred to above in gel form.

The reaction scheme discloses that the reaction proceeds with the consumption of the alkaline substance.

As examples of alkaline substances catalyzing the reaction mention should be made of the alkali metal hydroxides and the alkaline earth metal hydroxides.

The hydrophilic high molecular weight copolymerizate is gel-forming and should be in the form of gel grains when subjected to the substitution reaction. Preferably the product should be in the swollen form to allow the bifunctional substance to diffuse into the spaces of the substance to result in a substitution product as uniformly substituted as possible.

It is necessary that the substitution reaction should take place at a lower speed than the diffusion rate, from which it follows, that the conditions will be more unfavourable, the larger are the grains being employed. However, it has been found that, under all circumstances, it is possible to achieve a reaction product of a substitution sufficiently uniform for practical purposes if the size of the gel grains employed for the substitution reaction does not exceed the limit value of about 2 mm.

The best manner of carrying out the substitution reaction consists in first causing the hydroxyl group-containing starting material to swell in water in the presence of either the alkaline substance or the monofunctional compound of the formula $X_1 - R_1 - Y$ and adding the failing component, if desired in portions, to initiate the reaction. Alternatively the copolymerizate may first be swollen in pure water and after swelling has taken place the two failing reaction components can be added either simultaneously or separately.

However, the amount of water present in the reaction for introducing the basic groups should not be so high as to cause any substantial reaction between the water and the monofunctional compound to take place, as such a non-desired reaction would tend to increase the costs for the production of the substitution products. The water regain of the copolymerizate indicates the maximum amount of water which can be present during the substitution reaction.

REACTION TEMPERATURES AND TIMES

Suitable reaction temperatures are in the range of about 15 to 120° C. Although the substitution reaction proceeds more rapidly with increasing temperatures, it has been found that side-reactions, particularly the reaction between the water and the monofunctional compound will tend to increase at higher temperatures such as exceeding about 100° C. Reaction temperatures exceeding 100° C. are ordinarily avoided because they require the reactions to be carried out in a pressure vessel. Satisfactory speeds are ordinarily obtained in the range of about 50 to 90° C.

The period of time necessary for completing the reaction depends, of course, on the temperature chosen for the reaction. For reaction temperatures in the range of 15 to 120° C. it can be said that the reaction can be completed within about 2 to 48 hours.

THE AMOUNTS OF THE REACTANTS AND THE MIXING THEREOF

The proportion of the monofunctional compound to the hydrophilic high molecular weight copolymerizate should be such that the reaction results in a substitution product wherein at least about 6 percent of the hydroxyl groups originally present are substituted (on average about every fifteenth hydroxyl group). For practical purposes, especially if the substitution products are to be used as ion-exchangers, the proportion should be such that the reaction results in a product wherein at least 10 percent of the hydroxyl groups of the product are substituted.

As a rule it can be said that degrees of substitution exceeding about 50 percent (on average about every second hydroxyl group of the copolymerizate) do not fulfil any practical purpose. If the substitution is to be used for ion-exchange purpose, the degree of substitution should not exceed 30 percent (on average about every third hydroxyl group of the copolymerizate).

The ratio by weight of the monofunctional compound to the copolymerizate should preferably be in the range of about 1:10 to 5:1.

The alkaline catalyst should be added to the mixture of reactants in an amount exceeding that necessary for producing the reaction of the copolymerizate. This excess may preferably be about 10 percent.

It is of importance that the water, which may contain the alkali or the substance $X - R_1 - Z$ dissolved therein, should be as uniformly distributed throughout the mass of swollen copolymerizate as possible, as the grains are separated from each other and the contact surface between them is not very large.

Independently of the order and the manner by which the reaction components are brought together to effect the substitution it is preferable to provide an effective agitation of the reacting mixture.

For this purpose it may be suitable to carry out the substitution reaction in the presence of a solvent immiscible with the water, for example aliphatic or aromatic hydrocarbons such as toluene. Hereby the solvent fulfils the double purpose of serving on one hand as a suspending agent for the reacting mixture and on the other hand as an aid for removing the heat liberated in the substitution reaction and/or maintaining the reaction temperature at a constant value. Such a solvent may also serve as a solvent for the basic group-containing reaction component.

SPECIAL PRECAUTION STEPS IN THE REACTION

It has been found that even at relatively low reaction temperatures the oxygen of the atmosphere tends to oxidize the copolymerizates in gel form, what may result in a mis-colourization of the reaction formed. When it is desired to obtain a substitution product as little coloured as possible, the reaction should be carried out in an inert atmosphere. Such an atmosphere may be provided by nitrogen which is substantially inert to the reaction components involved.

In order to avoid a mis-colourization of the substitution product it may be suitable to add certain additives to the mixture of reactants. Such an additive is preferably a reduction agent the purpose of which is to reduce oxygen possibly present. As an example of a suitable reduction agent mention should be made of sodiumborohydride.

CHEMICAL AND PHYSICAL PROPERTIES OF THE REACTION PRODUCT

As a general rule it may be said that the substitution product according to the invention is characterized by a higher water regain than the starting material. This increase obviously depends on the introduction of the ion-exchange groups into the copolymerizate.

The factors determining whether or not a substituted copolymerizate according to the invention is suitable for ion-exchange purposes are the water regain and the ion exchange capacity.

The factors determining the water regain of the substituted product are the water regain of the starting material, the type of substitutent and the substitution degree.

The water regain of the starting material depends largely on the degree of cross-linking of the copolymerizate. This degree may be varied by varying the ratio of the bifunctional substance to the hydrophilic hydroxyl group-containing substance in the copolymerizate.

The swelling capacity, expressed as the "water regain" of the substitution product should be determined in distilled water as salts possibly present in the water tend to dislocate the results. The swelling tends to increase in the presence of great amounts of salts. This phenomenon corresponds to the "breathing" of ion-exchangers which will be more marked the higher is the water regain of the substitution product.

The ion-exchange capacity of the substitution product can be determined according to any one of the standard methods described in Kunin "Ion Exchange Resins," New York, 1958 (see: page 343–345). The ion-exchange capacity is expressed in millequivalents exchangeable ions per gram of the dry substituted copolymerizate.

TECHNICAL USE AND ADVANTAGES OF THE SUBSTITUTED COPOLYMERIZATE

The novel products according to the invention should preferably be used as anion-exchangers.

The anion-exchangers are of the same type as those described in the Journal of the American Chemical Society, Vol. 78, Feb. 20, 1956, pages 751–753. These exchangers are characterized by showing a very little so-called back-ground adsorption, which render them particularly useful for the chromatography of mixtures of large molecules.

The exchangers referred to are produced from hydroxyl-group-containing substances by reacting them with compounds to introduce basic groups therein. An adsorbent, called Ecteola-cellulose, containing basic groups derived from triethanolamine bound to cellulose through reaction with epichlorhydrin has been found to possess exceptional merit in the chromatography of proteins and nucleic acids.

The preparation of ion exchangers of this type is, however, subject to a limitation arising from the nature of the cross-linking bonds in cellulose. Hydrogen bonding between the hydroxyl groups is responsible for the insolubility of that material, and the attachment of small amounts of any substituent to the chain tends to increase swelling in water by interfering with hydrogen bonding. A large number of groups will cause the cellulose derivative to become water-soluble. Although ion-exchanging adsorbents of the type referred to having anion-exchange capacity of 2 milliequivalents per gram have been achieved by introducing basic groups in the cellulose, it has been found that products having anion-exchange capacity of more than 1 milliequivalent per gram have a tendency to be gelatinous due to the influence of water.

The novel products according to the invention may be rendered ion-exchange capacities of as high as 5 milliequivalents per gram or more by introducing the special basic groups described above in the copolymerizate of hydroxyl group-containing substances. When using the novel products as ion-exchangers, no tendency towards being gelatinous or dissolving in contact with water has been observed.

As different from the known ion-exchangers obtained by introducing basic groups in synthetic and natural resins, the present products do not show any essential so-called back-ground adsorption. They are also superior to the known products in other respects.

The tertiary amines produced according to the invention can be quaternized according to known methods, wherein alkyl halides, preferably alkyl chlorides or bromides, are reacted with the free amino groups. This reaction proceeds smoothly at slightly increased temperatures and in the presence of solvents capable of swelling the substitution products and also to dissolve the alkyl halide at least to some extent. The quaternizing reaction proceeds according to the formula:

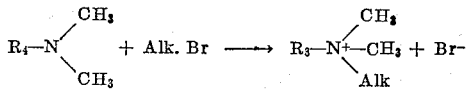

wherein $R_4$ stands for residue, free of the group Z, of the product obtained by the substitution reaction and Alk is a lower alkyl group.

Example 1

(a) 200 g. of washed potato starch were dissolved in 1 litre of an aqueous 2.5-n solution of sodium hydroxide and 140 g. of glycerol-1,3-dichlorohydrin were then added thereto with agitation. After 15 min. a gel had been formed. The gel was allowed to stand at room temperature for 2½ hours and was then cured for 18 hours at 60° C. The product was ground and dispersed in water, neutralized with hydrochloric acid, washed on a filter and dried in vacuum at 50° C. The weight of the product was 232 g. and its water regain 5.1 g./g.

(b) To 31.5 g. of the gel obtained according to (a) a solution of 13 g. of sodium hydroxide in 36 ml. of water was added, whereupon 24.7 g. of diethylaminoethylchloride hydrochloride were added. There was obtained a granular mass which was maintained at a reaction temperature of 60° C. with agitation for 17 hours. The product was dispersed with 4 x 2 litres of water, filtered and washed until the filtrate was salt-free and dried at 70° C. for 24 hours. Its weight was 38 g. with a water regain of 9 g./g. and the ion exchange capacity was 2.23 mequiv./g.

Example 2

(a) 200 g. of sorbitol were dissolved in 50 g. of sodium hydroxide in 50 ml. of water. 75 g. of epichlorohydrin were added dropwise during one hour at 50° C. After 5 hours at 50° C. the reaction mixture was dissolved in methanol and neutralized with conc. hydrochoric acid. The precipitated sodium chloride was filtered off and the methanol evaporated on a water bath. The residue was dissolved in 100 ml. of 2 N sodium hydroxide and 188 g. of ethyleneglycol-bis-epoxypropyl ether was added. The solution gelled after 15 minutes at 70° C. The reaction was completed by heating over night at 60° C. The product was ground, suspended in water, and neutralized. It was then washed on a filter and dried in vacuo at 60° C. The resulting gel weighed 307 g. and had a water regain of 2.5 g./g.

(b) To 43 g. of the gel obtained according to (a) there was added a solution of 70 g. of sodium hydroxide and 1 g. of sodium borohydride in 70 ml. of water. The swollen gel particles were suspended in 250 ml. of benzene and 140 g. of diethylaminoethylchloride hydrochloride were added. The mixture was heated to 72° C. for 6 hours while stirring. The product was filtered, suspended in water, neutralized and dried in vacuo at 60° C. 89 g. of a product with water regain 3.0 g./g. and an anion exchange capacity of 3.82 mequiv./g. were obtained.

Example 3

(a) To 20 kg. of dextran with an average molecular weight of 40,000 were added 27.2 l. of water and 4.4 kg. of 50 percent sodium hydroxide. To the solution was added 3.6 kg. of epichlorohydrin. After 1.5 hours the solution gelled. The reaction was completed by heating to 60° C. for 18 hours. The product was ground, suspended in water and neutralized. It was washed by repeated sedimentation in vacuo and decantation of the supernate. After drying a product with water regain 5.8 g./g. was obtained.

(b) To 1 kg. of the gel obtained in (a) was added 3.5 kg. of benzene and a solution of 600 g. of sodium hydroxide and 10 g. of sodium borohydride in 1000 ml. of water while stirring. Finally, 1390 g. of diethylaminoethylchloride hydrochloride were added and the mixture was heated to 72° C. for 6 hours. The product was filtered, suspended in water and neutralized. After repeated sedimentation in water and decantation it was dried in a drying box at 60° C. 840 g. of a product with water regain 9.7 g./g. and an anion exchange capacity of 2.75 mequiv./g. were obtained.

Example 4

(a) To 53.5 g. of dextran of an average molecular weight of 40,000 was added 10 ml. of water and 43.5 ml. of 2 N sodiumhydroxide. To the resulting solution was added 15 g. of bis-epoxypropylether. After one hour at room temperature the solution gelled. The reaction was completed by heating to 50° C. for 18 hours. The product was ground, suspended in water and neutralized. It was washed on filter with water and dried in vacuo at 60° C. The yield was 63 g. of a product with water regain 2.7 g./g.

(b) To 11 g. of the gel obtained in (a) was added a solution of 18 g. of sodium hydroxide and 0.5 g. of sodium borohydride in 18 ml. of water. The swollen gel particles were suspended in 63 ml. benzene and 35 g. of diethylaminoethylchloride hydrochloride added. The mixture was heated to 72° C. for 6 hours. The product was filtered, suspended in water and neutralized. It was washed on filter, and dried in vacuo at 70° C. The yield was 18 g. of a product with water regain 3.5 g./g. and an anion exchanged capacity of 3.95 mequiv./g.

Example 5

(a) 100 g. of polyvinylalcohol having an average molecular weight of 110,000 were swelled with 270 ml. of 5 N sodium hydroxide. The granular polymer-sodium hydroxide complex was intimately mixed with 60 g. of butanediol-bis-epoxypropylether. The mixture was heated at 60° C. for 17 hours with intermittent stirring. The product was insoluble in water. It was suspended in water, neutralized with hydrochloric acid, washed with water and fiinally dried in vacuo at 60° C. The yield was 108 g. of a product with water regain 5.0 g./g.

(b) To 22 g. of the product from (a) were added a solution of 35 g. of sodium hydroxide and 0.5 g. of sodium borohydride in 35 ml. of water. The swollen gel particles were suspended in 100 ml. of benzene and 75 g. of β-morfolinoethylchloride hydrochloride were added. The mixture was heated to 72° C. for 6 hours. The product was filtered, suspended in water, neutralized and dried in vacuo at 60° C. The yield was 32 g. of a product with water regain 6.4 g./g. and an anion exchange capacity of 4.0 mequiv./g.

Example 6

(a) 290 g. of dextran having an average molecular weight of 20,000 and 58 g. of sodium hydroxide were dissolved in 360 ml. of water. Then 110 g. of epichlorohydrin were stirred into the dextran solution. The reaction was allowed to proceed at 50° C. for 16 hours. Then the gel obtained was ground, suspended in water, neutralized with hydrochloric acid, washed with water and dried. The water regain of this product was 2.5 g./g. The yield was 275 g.

(b) 100 g. of the product obtained according to (a) were suspended in 500 ml. of toluene and a solution of 80 g. of sodium hydroxide in 350 ml. of water and 170 g. of diethylamino ethylchloride hydrochloride were added. The reaction was allowed to proceed at 70° C. for six hours, whereafter the product was suspended in water, the toluene was decanted off, the product was neutralized with hydrochloric acid, rinsed with water and dried. The yield was 150 g. of a product with an ion-exchanging capacity of 3.2 mequiv./g. and a water regain of 4.0 g./g.

Example 7

(a) 240 g. of dextran having an average molecular weight of 200,000 and 25 g. of sodium hydroxide were dissolved in 600 ml. of water. Then 25 g. of epichlorohydrin were stirred into the solution. After reaction and working-up according to Example 6a, a product with water regain of 5.0 g./g. was obtained. The yield was 230 g.

(b) 100 g. of the product obtained according to (a) was treated according to Example 6b. The yield was 147 g. of a product with an ion-exchange capacity of 3.2 mequiv./g. and a water regain of 20 g./g.

Example 8

(a) 80 g. of hydroxyethyl cellulose were dissolved in 540 ml. of water together with 8 g. of sodium hydroxide. 7 ml. of epichlorohydrin were then stirred into the solution. After reaction and working-up according to Example 6a, there were obtained 58 g. of a product with a water regain of 11 g./g.

(b) 20 g. of the product obtained according to (a) were suspended in 100 ml. of toluene. A solution of 16 g. of sodium hydroxide in 50 ml. of water and 34 g. of diethylamino ethylchloride hydrochloride were added. After reaction and working-up according to Example 6b, there were obtained 26 g. of a product with an ion-exchanging capacity of 3.0 mequiv./g.

Example 9

(a) 290 g. of sucrose and 65 g. of sodium hydroxide were dissolved in 300 ml. of water, and 140 g. of epichlorohydrin were stirred into the solution. The reaction was allowed to proceed at 40° C., and it was caused to cease slightly before a gel had been formed. The viscous solution was diluted with water, neutralized with hydrochloric acid and the copolymer of sucrose and epichlorohydrin was precipitated by the addition of ethanol. It was purified by four such reprecipitations. The yield was 70 g.

In order to get a gel of this copolymer 48 g. of it and 5 g. of sodium hydroxide were dissolved in 110 ml. of water and 10 ml. of epichlorohydrin were stirred into the solution. After reaction at 50° C. for 16 hours, the gel obtained was worked-up according to Example 6a. The yield was 45 g. and the water regain of the product was 2.9 g./g.

(b) 20 g. of the product obtained according to (a) were treated according to Example 8b, and there were obtained 26 g. of a product with an ion-exchange capacity of 3.2 mequiv./g.

Example 10

(a) 200 g. of white commercial dextrin were dissolved in 134 ml. of water containing 27 g. of sodium hydroxide.

Then 60 ml. of epichlorohydrin were stirred into the solution. After reaction at 25° C. over-night, the gel was worked-up according to Example 6a. The yield was 220 g. of a product with a water regain of 1.6 g./g.

(b) 50 g. of the product obtained according to (a) were mixed with a solution of 24 g. of sodium hydroxide in 50 ml. of water. Then a solution of 48 g. of diethylaminoethylchloride hydrochloride in 48 ml. of water was stirred into the mixture. After reaction at 25° C. over-night and at 60° C. for two hours, the product was worked-up according to Example 6a. 67 g. of a product with an ion-exchange capacity of 2.0 mequiv./g. were obtained.

TESTS CARRIED OUT WITH THE NOVEL ION EXCHANGERS

An ion-exchanger according to the invention consisting of gel grains comprising a copolymerizate obtained by copolymerizing dextran with epichlorohydrin and partially substituting diethylaminoethylene groups for the hydrogen of the hydroxyl groups was used for this purpose. The water regain of the copolymerizate was 15 g./g. and the ion-exchange capacity 3.5 milliequivalents per gram.

This ion exchanger was compared with an ion-exchanger obtained by partially substituting the hydrogen of the hydroxyl groups of cellulose with the same amino groups (DEAE-cellulose).

The comparative tests were carried out in such a manner that the two ion-exchangers were first put in equilibrium with an aqueous buffer solution of 0.02-n phosphate having a pH of 6.5. The ion-exchangers were then brought in contact with the same buffer solution now containing human serum albumin to attach the albumins to the ion-exchangers. The exchangers were then subjected to elution with a gradiant of increasing amounts of sodium chloride in the buffer solution. Hereby, it was found that the albumin began to be eluded at a concentration of 3 mgs. of sodium chloride per ml. from the ion-exchanger based on cellulose, while albumins commenced to be eluded at a concentration of 8 mgs. of sodium chloride per ml. from the ion-exchanger according to the invention.

The ion-exchangers according to the invention thus enable ion-exchange processes to be carried out at higher contents of salts what is an advantage inter alia from the point of view that minor variations of the concentrations of salt of the solutions to be treated will not be very disturbing.

The possibility of producing ion-exchangers having satisfactory ion-exchange properties combined with high water regains is of value for the chromatography of substances having large molecules, such as the enzyme pepsin. Of two ion-exchangers having about the same ion-exchange capacity but different water regains of 4.5 and 15 g./g., respectively, the latter was found to be capable of absorbing 2 g. of pepsin, while the former absorbed 0.5 g. at a pH-value of 3.5 in an aqueous buffer solution of sodium acetate. Pepsin has a molecular weight of about 30,000.

What we claim is:
1. As a novel compound, a copolymerizate of:
   (a) a member selected from the group consisting of polyvinyl alcohol, dextran, sorbitol, starch, hydroxyethyl cellulose, dextrin, and sucrose,
   (b) a bifunctional organic substance selected from the group consisting of epichlorohydrin, butanediol bis-epoxypropyl ether, glycerol, 1,3-dichlorohydrin, and bis-epoxypropyl ether which is capable of linking together the aforesaid members by the formation of ether linkages;
   (c) said copolymerizate originally containing 10 to 35 percent of hydroxyl groups, based on the weight of the dry substance, and having from 6 to 50 percent of their hydroxyl groups substituted by a member selected from the group consisting of radicals of the type —$R_1Y$, wherein
   (d) $R_1$ is an alkylene containing from 1 to 2, inclusive, carbon atoms, and
   (e) Y is selected from the group consisting of dimethylamino, diethylamino, di-(hydroxyethyl)amino, and beta-morfolino; and said novel compound,
   (f) being insoluble in water but capable of swelling therein,
   (g) having a water regain within the range of 1 to 50 grams per gram of the dry compound, and
   (h) having an ion exchange capacity within the range of from 2 to 6 milliequivalents per gram of the dry compound.

2. An anion exchanger consisting of the novel compound set forth in claim 1.

References Cited by the Examiner
UNITED STATES PATENTS

| | | | |
|---|---|---|---|
| 3,042,667 | 7/1962 | Flodin | 260—209 |
| 3,208,994 | 9/1965 | Flodin | 260—209 |
| 3,226,380 | 12/1965 | Knight | 260—2.2 |

SAMUEL H. BLECH, *Primary Examiner.*

WILLIAM H. SHORT, *Examiner.*

J. C. MARTIN, *Assistant Examiner.*